United States Patent Office 3,089,861
Patented May 14, 1963

3,089,861
POLYHYDROXY NITRILES AND THEIR
PRODUCTION
Hermann Leyerzapf, Mainz (Rhine), Germany, assignor to Deutsche Gold- und Silber-Scheideanstalt vormals Roessler, Frankfurt, Germany
No Drawing. Filed Nov. 2, 1961, Ser. No. 149,511
Claims priority, application Germany Nov. 3, 1960
11 Claims. (Cl. 260—67)

The present invention relates to novel polyhydroxy nitrile compounds and a process for preparing the same by reacting polyacroleins and especially macromolecular polyacroleins (having a molecular weight above about 10,000) with hydrogen cyanide in the presence of an alkaline catalyst.

It is known that unstabilized acrolein spontaneously polymerizes to an infusible and insoluble polyacrolein which is known as disacryl. Polymers of acrolein can also be produced by other known methods with the most varied types of catalysts under the most varied reaction conditions. Especially the macromolecular polyacroleins are insoluble and infusible substances which previously were assumed not to contain free aldehyde groups. It has become known in German Patent 1,016,020 that especially in the case of disacryl its capped aldehyde groups will react with compounds such as alcohols, thialcohols, thiophenols, hydroxyl amine compounds, bisulfites, hydrazine, amines or their derivatives to produce the corresponding functional derivatives in the presence of alkalies or acids. According to Gilbert and Donleavy (J. Amer. Chem. Soc. 60, 1938, p. 1911), free aldehyde groups could only be detected in certain oligomers and copolymers of acrolein with other vinyl compounds. U.S. Patent 2,833,743 discloses that copolymers of styrene and methacrolein react with hydrocyanic acid to produce cyanhydrins. Such copolymers of methacrolein, especially when they only contain a small proportion of the methacrolein component, possess good solubility in the normal solvents, such as, for example, benzene, toluene or mixtures with butanol. They therefore can be reacted in a homogeneous phase for the production of functional derivatives. The nitrogen content of the cyanhydrins of such patent indicates that only 57% of the aldehyde groups theoretically present in such copolymers reacted.

According to the invention it was unexpectedly found that polymeric α-hydroxynitriles can be prepared from polyacroleins and hydrogen cyanide in a heterogeneous phase reaction in the presence of an alkaline catalyst at temperatures between 0 and 100° C., preferably between 0 and 30° C. Aside from the fact that the reaction occurs in heterogeneous phase, it was also surprising that the polyacroleins employed do not undergo the Cannizzaro reaction in the presence of the alkaline catalyst as according to the indications in the literature, for example, Franzen, Ber. d. deut. Chem. Ges. 88 (1955), p. 1361, a disproportionation in the sense of a Cannizzaro reaction already occurs in the presence of a tertiary amine.

As indicated above, polyacroleins can be produced with the most varied catalysts. Of the polyacroleins obtainable in this manner, those produced with redox catalysts, especially those of the type of potassium persulfate/silver nitrate or with sulfur dioxide or its derivatives as catalysts, are especially suited as starting materials according to the invention. Both types of catalysts are also suited for the production of emulsion polymers of acrolein in which especially finely divided polymers are obtained which because of their fine subdivision are especially susceptible to further reactions. Such emulsion polymers are best suited for the conversion to α-hydroxynitriles according to the invention. The so-called disacryl and polyarcroleins produced with basic catalysts are less suited for the purposes of the invention.

The hydrogen cyanide is preferably used in liquid form. If desired, it can be diluted with a solvent. It is also possible to employ gaseous hydrogen cyanide which, if desired, also can be strongly diluted with another gas. When liquid hydrogen cyanide is used it is advantageous to dilute it with water and especially good results are obtained in the formation of the α-hydroxy nitriles when hydrogen cyanide/water mixtures are used in the volumetric ratio of 2:1 (as liquids).

The reaction of the polyacroleins with the hydrogen cyanide proceeds best in the presence of alkaline catalysts. Strong bases, such as alkali metal hydroxides, for example, sodium hydroxide, alkaline earth metal hydroxides, for example, calcium hydroxide, and ammonia, are especially suited as such alkaline catalysts. Strong organic bases, such as triethyl amine, trimethyl amine or piperidine, are equally effective. Mixtures of such catalytic bases can also be used. The catalysts expediently are employed in quantities above 0.1%, preferably in quantities of 4–5%, by weight with reference to the polyacrolein to be converted. The larger the quantity of catalyst the greater the reaction velocity, for example, 0.5% by weight of NaOH requires a reaction period of 92 hours whereas 4.2% by weight of NaOH, the other conditions being the same, shortens the reaction period required to 75 minutes. The quantity of catalyst employed may also depend upon the acidity of the starting material. For example, when a strongly acidic polyacrolein is employed it is in any event necessary to employ a sufficient amount of catalyst that the pH during the reaction remains between 7 and 10.

In the process according to the invention it is preferable to start with a polyacrolein suspended in a suitable solvent. To this end, either a normal polymer can be employed and after vacuum drying thereof, suspending it, for example, in methanol, acetonitrile, or liquid hydrogen cyanide, if desired, with the addition of water or to displace the medium employed for the polymerization by methanol acetonitrile or liquid hydrogen cyanide. In general it suffices merely to suspend the dried polyacrolein in the selected solvent or diluent medium in a finely divided state by mechanical measures. Thereafter, subsequent to the addition of the catalyst, hydrogen cyanide in liquid or gaseous form is supplied to such suspension at low temperatures, preferably between 0 and +5° C. It, however, is also possible to add the catalyst after the hydrogen cyanide has been introduced. The actual conversion of the reaction mixture to form the α-hydroxy nitriles occurs at slightly higher temperatures, preferably between 10 and 20° C. Light wine yellow colored clear solutions of the polyacrolein cyanhydrin in the solvent selected are obtained as reaction products. The polyacrolein cyanhydrin can be recovered from such solutions as solid weakly yellowish solids by vacuum evaporation after evaporation of the unreacted hydrogen cyanide at temperatures not in excess of 50° C. The solid products have no melting point but discolor towards yellow-orange upon heating to 120–150° C. Depending upon the conditions of their production, they are completely to partially soluble in dimethyl formamide, formamide and dilute aqueous NaOH. They are less soluble in methanol and acetone. The nitrogen content thereof is between 10.22 and 13.58%. These nitrogen contents calculated on the carbonyl groups present in the starting material correspond to conversions between 72.5 and 96.4%.

The products according to the invention therefore are poly α-hydroxynitrile compounds derived from polyacroleins in which 72.5 to 96.4% of the theoretically present aldehyde groups (—CHO groups) have been converted to

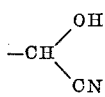

groups and disregarding the units in which the aldehyde groups have not been converted are of the formula

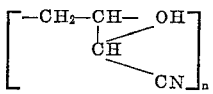

or taking into consideration the units in which the aldehyde groups have not been converted are of the formula

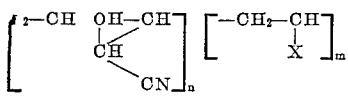

wherein X represents the unreacted aldehyde groups whether in free form or masked form as in aldehyde hydrate ether groups and $n+m$ is the total number of acrolein units in the polymer.

The products obtainable according to the invention can be used e.g. as pesticides for they split off slowly and in nearly constant rates HCN sufficient for a knock-down of insects or similar parasites.

The following examples will serve to illustrate several embodiments of the invention.

*Example 1*

A polyacrolein prepared by polymerization of acrolein with a redox catalyst ($K_2S_2O_8$/$AgNO_3$) having an average molecular weight of 39,000 (specific viscosity η spec. c. $10^2$, l.g.$^{-1}$:3.9) and whose combustion analyses indicated that the molecular weight of the basic repeating unit was $59.3=C_3H_{4.3}O_{1.2}$, was used as the starting material.

6.25 g. of such polyacrolein (about 0.1 mol equiv.) were suspended with stirring in 75 cc. of methanol and the suspension cooled to $+2°$ C. Thereupon gaseous HCN was introduced until a weight increase of 2.1 g. occurred (about 0.11 mol). Then 0.65 cc. of n/1 NaOH, corresponding to 0.49% by weight based upon the polyacrolein (dry substance 97%) were added to the suspension. The milky white suspension dissolved within 92 hours (maximum temperature 20° C.) to a clear wine yellow solution. The unconverted HCN was then sucked off and the solution evaporated to dryness under a water jet vacuum with a temperature of 50° C. as maximum. A light yellow solid flaky product was obtained. After washing out the alkali and drying until a constant weight was reached, 7.5 grams of solid product were obtained which was completely soluble in formamide, dimethyl formamide and dilute aqueous NaOH and partially soluble in methanol and acetone. The nitrogen content was 10.25% by weight, corresponding to a conversion of 72.7% of the carbonyl groups contained in the starting material (81.9% according to the method of Bryant and Smith, J. Am. Chem. Soc. 57 (1935) p. 57).

The following table shows the results obtained using different quantities of NaOH as catalyst in percent by weight based on the polyacrolein (dry substance):

| Catalyst, percent by wt. | Reaction period, minutes | Reaction product, grams | N Content, percent by wt. | Conversion in percent of carbonyl groups present |
| --- | --- | --- | --- | --- |
| 1 | 320 | 8.1 | 11.17 | 79.3 |
| 2.1 | 240 | 8.3 | 10.22 | 72.5 |
| 4.2 | 75 | 8.4 | 10.33 | 73.3 |

When n/1 NaOH was used as the catalyst, it was necessary to cool the polyacrolein-solvent suspension before addition of the catalyst. If the NaOH is added at room temperature, yellowish brown flocks separate out after 1–2 minutes with spontaneous self-heating to about 30° C. Such flocks do not disappear after cooling down and addition of HCN, even after standing for days (disproportionation of portion of polyacrolein).

*Example 2*

The same polyacrolein as employed in Example 1 was used. 6.25 g. were suspended with stirring in 50 cc. of methanol and 25 cc. of water and the suspension cooled to $+1°$ C. Thereupon gaseous HCN was introduced until a weight increase of 3.3 g. (0.12 mol) occurred. After addition of 0.24 g. percent of $NH_3$ (1 cc. of a 28% aqueous solution), corresponding to 4.3% by weight based upon the polyacrolein (dry substance), the polyacrolein gradually dissolved at $+10$ to $+20°$ C. A water clear, light wine yellow solution was obtained within 40 minutes after the addition of the catalyst. Upon evaporation of the methanol and water under vacuum at about 50° C., a light yellow solid resinous brittle residue remained behind. Such residue was partially soluble in formamide, dimethyl formamide, dilute NaOH, methanol and acetone. 7.8 g. of solid product containing 12% by weight of nitrogen were obtained after drying to constant weight. This corresponded to an 85.1% conversion of the carbonyl groups contained in the polyacrolein.

*Example 3*

(a) 12.5 g. of polyacrolein (as used in Example 1) were suspended with stirring in 150 cc. of methanol and cooled to about $+1°$ C. After addition of 0.12 g. percent of trimethyl amine, corresponding to 1% by weight based on the polyacrolein (dry substance), HCN was supplied at a temperature of about 1 to 6° C. until a weight increase of 6.1 g. (0.23 mol) occurred. The milky white suspension cleared up gradually within 22.5 hours at $+10$ to 20° C. The resulting clear light wine yellow solution was evaporated to dryness under vacuum at a maximum temperature of 50° C. after suctioning off the unconverted HCN. 15.5 g. of cyanhydrin of a nitrogen content of 11.63% by weight were obtained after drying the solid brittle light yellow residue until a constant weight was reached. This corresponds to an 82.5% conversion of the carbonyl groups contained in the starting polyacrolein. The reaction product dissolved completely in dimethyl formamide, formamide, dilute NaOH and acetone and partially in methanol. The product, as is the case with all reaction products of polyacroleins with HCN, did not possess a melting point at temperatures up to 360° C. The products discolor upon heating to a dark brown in a sealed tube and to black in an open tube, passing through an orange coloration at about 120 to 150° C.

(b) 6.25 g. of polyacrolein were suspended with stirring in 75 cc. of methanol and cooled to $+1.5°$ C. After addition of 0.24 g. percent of trimethyl amine, corresponding to 4.2% by weight based upon the polyacrolein (dry substance), 3.4 g. of gasous HCN were introduced with further cooling. The milky white suspension was then maintained at $+10°$ C. to $+20°$ C. while stirring. In 270 minutes dissolution to a clear light wine yellow solution occurred. After suctioning off the unconverted HCN which was recovered as NaCN in an NaOH scrubber, the solution was evaporated to dryness under a water jet vacuum at a maximum temperature of 50° C. 8.6 g. of a brittle light yellow residue were obtained which was partially soluble in dimethyl formamide, formamide and acetone and completely soluble in methanol and dilute NaOH. After drying to a constant weight, 8.2 g. of the cyanhydrin derivative were obtained with a nitrogen content of 11.93%, corresponding to an 84.6% conversion of the carbonyl groups contained in the starting polyacrolein.

(c) Upon repetition of the procedure under (b), except that a mixture of 50 cc. of methanol and 25 cc. of water was used as the suspending agent, the time required for complete solution of the polyacrolein was shortened to 95 minutes. 7.3 g. of reaction product containing 10.73% by weight of nitrogen, corresponding to a 76.1% conversion of the carbonyl groups of the polyacrolein, were obtained. It was partially soluble in dimethyl formamide, formamide, dilute NaOH, methanol and acetone.

(d) Upon repetition of the procedure under (b), again using methanol as the suspending agent but using 7.2% by weight of trimethyl amine as the catalyst, the time required for completion of the reaction was shortened to 65 minutes. 16.1 g. of reaction product were obtained upon evaporation of the reaction solution obtained using 12.5 g. of polyacrolein as starting material. The light yellow reaction product was completely soluble in dimethyl formamide, formamide and dilute NaOH and partially soluble in acetone and methanol. After drying to a constant weight, 15.0 g. of a cyanhydrin product containing 11.86% by weight of nitrogen, corresponding to a 84% conversion of the carbonyl groups of the polyacrolein, were obtained.

*Example 4*

(a) 6.25 g. of polyacrolein (about 0.1 mol equiv.) were suspended with stirring in 75 cc. of acetonitrile. After cooling to +2° C., 3.6 g. of HCN were condensed in such suspension and 0.24 g. percent of trimethyl amine corresponding to 4.2% by weight based on the polyacrolein (dry substance) added thereto. The milky white suspension gradually cleared in 16 hours at +10 to +20° C. to a water clear weakly wine yellow solution. After vacuum evaporation with a 50° C. temperature maximum, 8.6 g. of a light yellowish brown product was obtained which was partially soluble in dimethyl formamide, formamide, acetone, methanol and dilute NaOH. After drying to a constant weight, 8.1 g. of the reaction product containing 12.58% by weight of nitrogen were obtained. This corresponds to an 80.3% conversion of the carbonyl groups of the polyacrolein.

(b) 6.25 g. of polyacrolein were suspended in a mixture of 50 cc. of acetonitrile and 25 cc. of water and the suspension cooled to +2° C. After 3.5 g. of gaseous HCN were condensed in such suspension, 0.24 g. percent of trimethyl amine were added. Complete solution to provide a light wine yellow clear solution occurred after only 20 minutes at +10 to +20° C. 8.5 g. of a weakly yellow brittle reaction product were recovered by vacuum evaporation. The solubility and other properties thereof corresponded to that of the product of Example 1. After drying to a constant weight, 8 g. of the product were obtained containing 11.91% by weight of nitrogen. This corresponds to an 84.5% conversion of the carbonyl groups of the polyacrolein.

*Example 5*

(a) 6.25 g. (0.1 mol equiv.) of polyacrolein were suspended at 0° C. in a mixture of 50 cc. of liquid HCN and 25 cc. of water with stirring. After addition of 0.24 g. percent of trimethyl amine, corresponding to 4.2% by weight based on the polyacrolein (dry substance), the milky white suspension dissolved in 10 minutes at 0 to +8.5° C. to form a clear light wine yellow solution. After distilling off the excess HCN and evaporating to dryness, 8.6 g. of a brittle weakly yellow product were obtained which was partially soluble in dimethyl formamide, formamide, dilute NaOH, acetone anl alcohol. After drying to a constant weight, 8.11 g. of the product were obtanied containing 13.58% of nitrogen. This corresponds to a 96.4% conversion of the carbonyl groups contained in the polyacrolein.

(b) The procedure of (a) was repeated with various HCN-water mixtures, namely, (1) 37.5 cc. HCN and 37.5 cc. water and (2) 25 cc. HCN and 50 cc. water. The results are given in the following table

| HCN-H$_2$O mixture | Reaction product in grams | N content, percent by wt. | Conversion of carbonyl groups, percent |
|---|---|---|---|
| 1 | 8.0 | 12.25 | 86.9 |
| 2 | 6.9 | 10.33 | 73.3 |

*Example 6*

6.25 g. of polyacrolein as used in Example 1 were suspended with stirring in 75 cc. of methanol. After cooling to +1.5° C., 3.4 g. of gaseous HCN were condensed in the suspension and 0.23 g. of triethyl amine introduced, corresponding to 4.1% by weight based on polyacrolein (dry substance). The milky white suspension became clear in 210 minutes and formed a light wine yellow solution. After suctioning off the excess HCN, the solution was evaporated to dryness under a water jet vacuum with a 50° C. temperature maximum. 8.5 g. of a weakly yellow brittle solid was obtained which was almost completely soluble in dimethyl formamide but only partially soluble in formamide, dilute NaOH, acetone and methanol. After drying to a constant weight, 7.9 g. of the product, namely, the cyanhydrin of polyacrolein, were obtained containing 10.50% by weight of nitrogen. This corresponds to a 74.5% conversion of the carbonyl groups present in the polyacrolein.

Repetition of the experiment with the same polyacrolein and catalyst quantities and practically the same quantity of HCN (3.6 g.), but using a methanol water mixture (50 cc. methanol, 25 cc. H$_2$O), gave the following results: Reaction period—190 minutes, reaction product—8.1 g. containing 11.08% by weight of nitrogen, 78.6% conversion of the carbonyl groups in the polyacrolein.

*Example 7*

6.25 g. of polyacrolein as used in Example 1 were suspended with stirring in 75 cc. of methanol. After cooling to 2–3° C., 0.3 g. of piperidine, corresponding to 5.2% of the polyacrolein (dry substance) were added. Subsequently, 3.1 g. of gaseous HCN were condensed in the suspension with cooling. Within 45 hours the suspension clarified to a clear light yellow solution. During such period it was maintained at a temperature not exceeding 20° C. After suctioning off the unconverted HCN, the solution was evaporated to dryness under a water jet vacuum with a 50° C. temperature maximum. 7.9 g. of a light yellow brittle residue were obtained which was completely soluble in dimethyl formamide, formamide, dilute NaOH and methanol and partially soluble in acetone. After drying to a constant weight, 7.4 g. of cyanhydrin derivative containing 13.13% by weight of nitrogen were obtained. This corresponds to a 93.0% conversion of the carbonyl groups contained in the polyacrolein.

Upon repetition of the experiment with the same starting polyacrolein, using 4.2% by weight of piperidine catalyst and 3.6 g. (0.13 mol) of HCN suspended in a mixture of 50 cc. of methanol and 25 cc. of H$_2$O, the reaction period required was shortened to 9.65 hours. 8.8 g. of solid reaction product were obtained after evaporation of the solution which dissolved partially in dimethyl formamide, formamide, dilute NaOH, methanol and acetone. After drying to a constant weight, 8.3 g. of cyanhydrin derivative containing 11.07% of nitrogen were obtained. This corresponds to a conversion of 78.5% of the carbonyl groups contained in the polyacrolein.

*Example 8*

(a) The polyacrolein employed was an emulsion polymer obtained from destabilized acrolein with a K$_2$S$_2$O$_8$/AgNO$_3$ redox catalyst. Its molecular weight was about 106,000 and its specific viscosity was η spec. c. 10² (l.g.⁻¹): 7.38. The carbonyl group content was 77.5 mol percent determined according to Bryant and Smith, J. Amer. Chem. Soc. 57 (1935), p. 57.

6.25 g. (about 1 mol equiv.) of such polyacrolein were suspended with stirring in a mixture of 50 cc. of acetonitrile and 25 cc. of water and after cooling to about 3° C., 2.7 g. of gaseous HCN (0.1 mol) condensed therein. Then 0.24 g. of trimethyl amine, corresponding to 4.2% by weight of polyacrolein (dry substance), were added thereto. The milky white suspension dissolved in 28 minutes while a temperature between 10 and 20° C. was maintained. Upon suctioning off the excess HCN and evaporating to dryness under a water jet vacuum at a 50° C. temperature maximum, 8.2 g. of a solid brittle almost white residue were obtained which was partially soluble in dimethyl formamide, formamide, dilute NaOH, acetone and methanol. After drying to a constant weight, 7.6 g. of cyanhydrin derivative containing 11.25% by weight of nitrogen were obtained. This corresponds to an 83.0% conversion of the reactive carbonyl groups contained in the polyacrolein.

(b) An emulsion polymer prepared analogously to that of (a), but having a molecular weight of about 206,000, a specific viscosity of η spec. c. 10² (l.g.⁻¹): 12.5 and a carbonyl content of 73.9 mol percent according to Bryant and Smith, was employed.

6.25 g. of such polyacrolein were dissolved with stirring in a mixture of 50 cc. of acetonitrile and 25 cc. of water, and after cooling to about 2° C., 2.7 g. of gaseous HCN (0.1 mol) condensed therein. Then 0.24 g. percent of trimethyl amine were added in the form of a 40% aqueous solution (0.6 g. with 40.1% by weight), corresponding to 4.1% by weight with reference to the polyacrolein (dry substance). At 10 to 20° C. the milky white suspension dissolved to form a clear wine yellow solution in 54 minutes. After suctioning off the unconverted HCN the solution was evaporated to dryness under a water jet vacuum at a 50° C. temperature maximum. 9.8 g. of a brittle light yellow reaction product were obtained which partially dissolves in dimethyl formamide, formamide, dilute NaOH, acetone and methanol. After drying to constant weight, 8.7 g. of cyanhydrin derivative containing 10.71% by weight of nitrogen were obtained. This corresponds to a 79.1% conversion of the reactive carbonyl groups contained in the high molecular weight polyacrolein.

*Example 9*

The polyacrolein employed was one obtained by polymerizing destabilized acrolein with gaseous SO₂. It was free from sulfur and had a carbonyl group content of 75.4% according to Byrant and Smith.

6.25 g. (about 0.1 mol equiv.) of such polyacrolein were suspended with stirring in a mixture of 125 cc. of acetonitrile and 25 cc. of H₂O and after cooling to about 2.5° C., 3.1 g. of gaseous HCN (about 0.11 mol) condensed therein. Then 0.24 g. percent of trimethyl amine corresponding to 4.1% by weight with reference to the polyacrolein (dry substance) were added. The milky white suspension became translucent with a light yellow color tone after 180 minutes at 10 to 20° C. and still contained some undissolved flocks which did not appear even after longer periods at such temperatures. The small quantities of undissolved material were filtered off with glass wool and the resulting clear light wine yellow solution evaporated to dryness under a water jet vacuum at a 50° C. temperature maximum. 7.6 g. of an almost colorless, weakly yellowish resinous brittle residue were obtained which is partially soluble in dimethyl formamide, formamide, dilute NaOH, acetone and methanol. After drying to a constant weight, 7.0 g. of cyanhydrin derivative with a 11.28% by weight nitrogen content were obtained. This corresponds to a conversion of 84.4% of the reactive carbonyl groups of the polyacrolein.

Repetition with smaller quantities of suspension medium, for example, 50 cc. of acetonitrile and 25 cc. of water or 100 cc. of methanol and 50 cc. of water with the other conditions remaining the same led to the formation of gelatinous dispersions containing insoluble portions. Processing of such partial solutions led to the production of brown insoluble products.

I claim:

1. A process for the production of a poly-α-hydroxy nitriles which comprises reacting macromolecular polyacrolein with hydrogen cyanide at a temperature between 0 and 100° C. at a pH between 7 and 10 in the presence of an alkaline catalyst.

2. The process of claim 1 in which said reaction is carried out in the presence of water.

3. The process of claim 1 in which said reaction is carried out in the presence of a quantity of water to provide a liquid volumetric ratio of hydrogen cyanide to water of 2:1.

4. The process of claim 1 in which said reaction is carried out at a temperature between 0 and 30° C.

5. The process of claim 1 in which the alkaline catalyst is at least one alkaline substance selected from the group consisting of alkali metal hydroxides, alkaline earth metal hydroxides, ammonia, triethyl amine, trimethyl amine and piperidine.

6. The process of claim 1 in which said reaction is carried out with a suspension of the polyacrolein.

7. The process of claim 1 in which said reaction is carried out with a suspension of the polyacrolein in methanol.

8. The process of claim 1 in which said reaction is carried out with a suspension of the polyacrolein in aqueous methanol.

9. The process of claim 1 in which said reaction is carried out with a suspension of the polyacrolein in acetonitrile.

10. The process of claim 1 in which said reaction is carried out with a suspension of the polyacrolein in aqueous acetonitrile.

11. The product obtained by a process according to claim 1 having the general formula

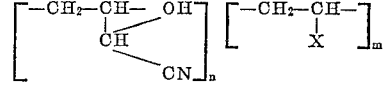

wherein X represents the unreacted aldehyde groups whether in free form or masked form as in aldehyde hydrate ether groups and $n+m$ is the total number of acrolein units in the polymer, the molecular weight being above 10,000.

References Cited in the file of this patent
UNITED STATES PATENTS
3,047,588    Van Ess _____ July 31, 1962